(12) United States Patent
Stack et al.

(10) Patent No.: US 10,704,303 B2
(45) Date of Patent: Jul. 7, 2020

(54) SELF-ALIGNING LATCHING INTERFACE FOR A LATCHING ACTUATOR

(71) Applicant: GM Global Technology Operations LLC, Detroit, MI (US)

(72) Inventors: Matthew M. Stack, Macomb Township, MI (US); Dayananda Narasimhaiah, Franklin, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 78 days.

(21) Appl. No.: 15/994,142

(22) Filed: May 31, 2018

(65) Prior Publication Data

US 2019/0368240 A1 Dec. 5, 2019

(51) Int. Cl.
*E05B 83/34* (2014.01)
*B60K 15/05* (2006.01)

(52) U.S. Cl.
CPC .............. *E05B 83/34* (2013.01); *B60K 15/05* (2013.01); *B60K 2015/053* (2013.01); *B60K 2015/0507* (2013.01); *B60K 2015/0576* (2013.01)

(58) Field of Classification Search
CPC . E05B 83/34; B60K 15/05; B60K 2015/0576; B60K 2015/0507; B60K 2015/053
See application file for complete search history.

(56) References Cited

FOREIGN PATENT DOCUMENTS

DE      102016012821 A1 *  5/2018  ............. B60K 15/05

* cited by examiner

*Primary Examiner* — D Glenn Dayoan
*Assistant Examiner* — Melissa Ann Bonifazi

(57) ABSTRACT

A latching assembly includes a hinge defining a slot, the slot having a slot length and a slot width, wherein the slot length is greater than the slot width, and a latching actuator having a housing and a plunger partially disposed in the housing, the plunger configured to translate and rotate relative to the housing, the plunger having a distal end with a plunger end length and a plunger end width, wherein the plunger end length is greater than the plunger end width, the plunger configured to be inserted into the slot. The plunger end length is greater than the slot width and the plunger end length is less than the slot length by a clearance amount.

14 Claims, 5 Drawing Sheets

SELF-ALIGNING LATCHING INTERFACE FOR A LATCHING ACTUATOR

INTRODUCTION

The present disclosure relates to a latching interface for a latching actuator, and more particularly to a self-aligning latching interface for a latching actuator used in a motor vehicle.

Motor vehicles include many features that benefit from having a latching door that protects or covers the feature from the environment. Examples of these features include compartments, such as glove boxes, trunks, storage consoles, etc., mechanisms, controls, and ports, such as electric charge ports and fuel ports. In these examples, a door is mounted to a hinge that pivots relative to the feature. The hinge includes a latching receptacle for receiving part of a latching actuator. The latching actuator engages with the latching receptacle to latch the hinge in a closed position. The latching actuator may also be configured to lock the hinge in the closed position. Currently, these latching actuators and latching receptacles do not allow for correction for positional variation during load on the latching actuator when engaging the latching receptacle. In addition, these latching actuators and latching receptacles may require tuning due to manufacturing variations, special tooling actions or unique component orientation, and may be sensitive to wear and damage.

Thus, while current latching actuators and latching interfaces achieve their intended purpose, there is a need for a new and improved system and method for a latching assembly that addresses these issues.

SUMMARY

According to several aspects, a latching assembly is provided that includes a hinge defining a slot, the slot having a slot length and a slot width, wherein the slot length is greater than the slot width, and a latching actuator having a housing and a plunger partially disposed in the housing, the plunger configured to translate and rotate relative to the housing, the plunger having a distal end with a plunger end length and a plunger end width, wherein the plunger end length is greater than the plunger end width, the plunger configured to be inserted into the slot. The plunger end length is greater than the slot width and the plunger end length is less than the slot length by a clearance amount.

In one aspect, the plunger end length is defined by first and second arms disposed at the distal end that extend out from a body of the plunger.

In another aspect, the first arm includes a first semi-spherical surface and a first front angled surface and the second arm includes a second semi-spherical surface and a second front angled surface.

In another aspect, the hinge includes a bar that extends over the slot on a side of the hinge away from the latching actuator, wherein the distal end of the plunger contacts the bar when disposed through the slot.

In another aspect, the bar has a curved surface that faces the slot.

In another aspect, the distal end of the plunger is semi-spherical.

In another aspect, an apex of the semi-spherical distal end is coaxial with the body of the plunger.

In another aspect, the plunger is moveable between a latched position and an unlatched position, and the arms are aligned with the slot length when in the unlatched position and the arms are perpendicular to the slot length when in the latched position.

In another aspect, the hinge includes an angled face surrounding the slot.

In another aspect, the hinge includes an inner surface that faces the latching actuator, and the angled face is disposed on the inner surface.

In another aspect, the hinge includes an outer surface that faces away from the latching actuator, and the outer surface having a crown that surrounds the slot.

In another aspect, a door is coupled to the hinge.

According to several aspects, an assembly for a fuel/charge port includes a hinge defining a slot, the slot having a slot length and a slot width, wherein the slot length is greater than the slot width, the hinge including a bar disposed overtop the slot to define a locking receptacle, and a latching actuator having a housing and a plunger partially disposed in the housing, the plunger configured to translate and rotate relative to the housing, the plunger having first and second arms disposed at a distal end, the first and second arms defining a plunger end length, wherein the plunger is moveable between a latched position where the first and second arms are disposed in the locking receptacle and are perpendicular to the slot length and an unlatched position where the first and second arms are aligned with the slot length. The plunger end length is greater than the slot width and the plunger end length is less than the slot length by a clearance amount.

In one aspect, the hinge includes a front surface and a back surface, and the back surface includes an angled face surrounding the slot.

In another aspect, the front surface includes a crown surrounding the slot.

In another aspect, a door is attached to the front surface of the hinge.

In another aspect, the first arm includes a first semi-spherical surface configured to engage the crown of the hinge and a first front angled surface configured to engage the angled face of the hinge, and the second arm includes a second semi-spherical surface configured to engage the crown of the hinge and a second front angled surface configured to engage the angled face of the hinge.

In another aspect, the bar has a curved surface that faces the slot and the distal end of the plunger contacts the curved surface of the bar when disposed through the slot and moving to the latched position.

In another aspect, the clearance amount is approximately 2 mm.

According to several aspects, an assembly for a fuel/charge port includes a hinge having a front surface, a back surface and defining a slot, the slot having a slot length and a slot width, wherein the slot length is greater than the slot width, the hinge including a bar disposed on the front surface over the slot to define a locking receptacle, wherein the back surface includes an angled face surrounding the slot and the front surface includes a crown surrounding the slot, a door coupled to the front surface of the hinge, and a latching actuator having a housing and a plunger partially disposed in the housing, the plunger configured to translate and rotate relative to the housing, the plunger having first and second arms disposed at a distal end, the first and second arms defining a plunger end length, wherein the plunger is moveable between a latched position where the first and second arms are disposed in the locking receptacle and are perpendicular to the slot length and an unlatched position where the first and second arms are aligned with the slot length, wherein the first arm includes a first semi-spherical surface and a first front angled, and the second arm includes a second semi-spherical surface and a second front angled surface, wherein the first and second semi-spherical surfaces are configured to engage the crown of the hinge surface when in the latched position and the first and second angled front surfaces are configured to engage the angled face of the hinge when the plunger is inserted into the locking receptacle. The bar has a curved surface that faces the slot and the distal end of the plunger contacts the curved surface of the bar when disposed through the slot and moving to the latched position. The plunger end length is greater than the slot width and the plunger end length is less than the slot length by a clearance amount.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
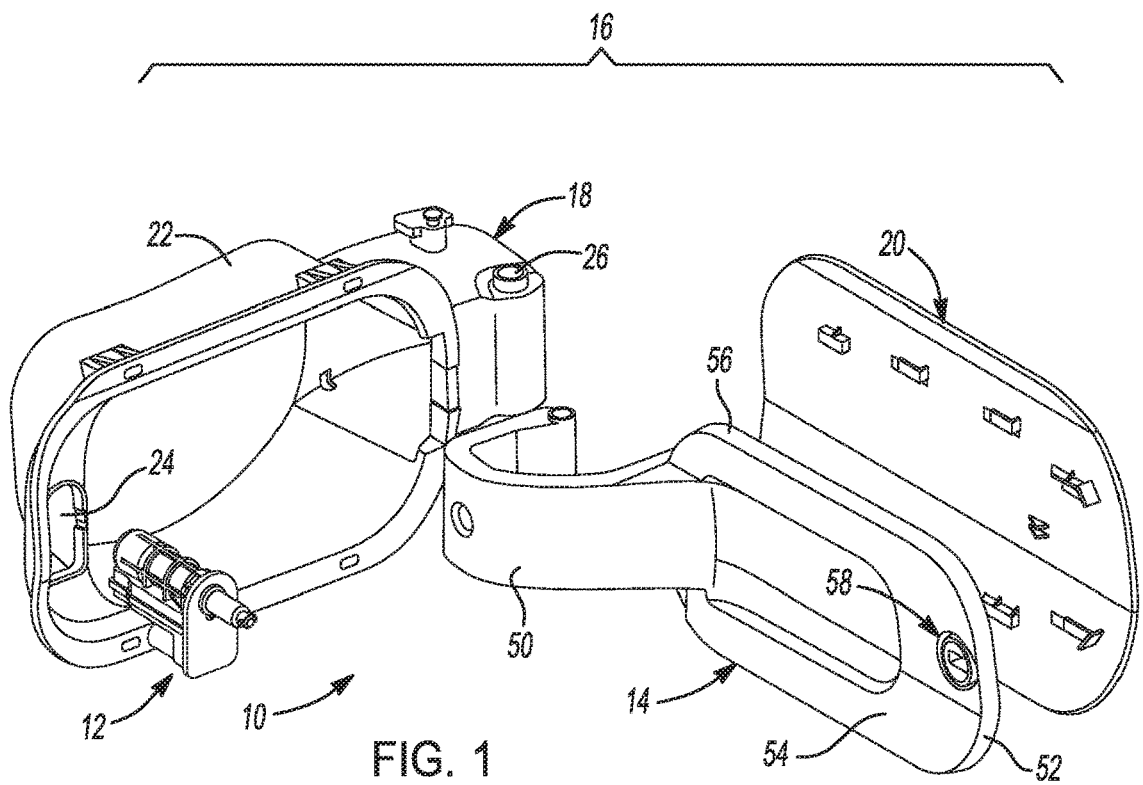
FIG. 1 is front perspective exploded view of a latching assembly and fuel/charge port assembly.

Referring to FIG. 1, a latching assembly is shown and generally indicated by reference number 10. The latching assembly 10 includes a latching actuator 12 and a hinge 14. As will be described in greater detail below, the latching actuator 12 is configured to latch the hinge to a closed position and unlatch the hinge 14 to allow the hinge 14 to move to an open position. The latching assembly 10 may be used in various environments, including, but not limited to, compartments, such as glove boxes, trunks, storage consoles, etc., mechanisms, controls, and ports, such as electric charge ports and fuel ports. In addition, the latching assembly 10 may be used in a motor vehicle or any other product requiring a latching door. In the example provided, the latching assembly 10 is shown employed with a fuel/charge port assembly 16 of a motor vehicle, which derives particular benefit from the latching assembly 10. The fuel/charge port assembly 16 includes a port housing 18 and a door 20. The port housing 18 is mounted to a vehicle frame (not shown) and defines a port 22 for receiving a fuel pump nozzle or an electric charge connector. The port housing 18 defines an aperture 24 for receiving and supporting the latching actuator 12. The hinge 14 is pivotally connected to the port housing 18 at a pivot point 26. The door 20 is mounted to the hinge 14 and covers the port 22 when closed and exposes the port 22 when opened.

Figure 2:
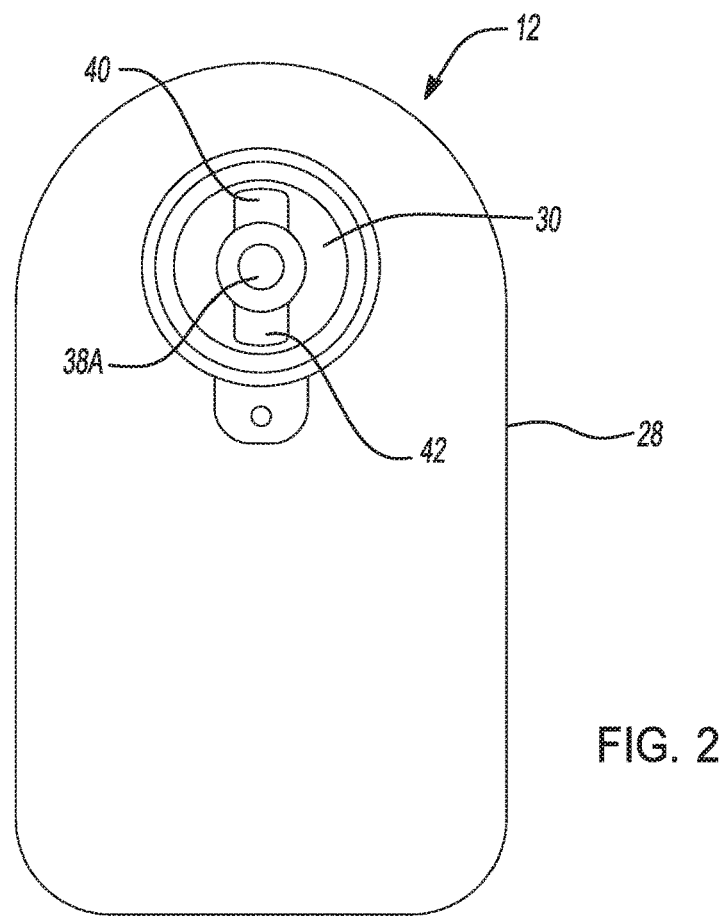
FIG. 2 is a front view of a latching actuator.
Figure 3:
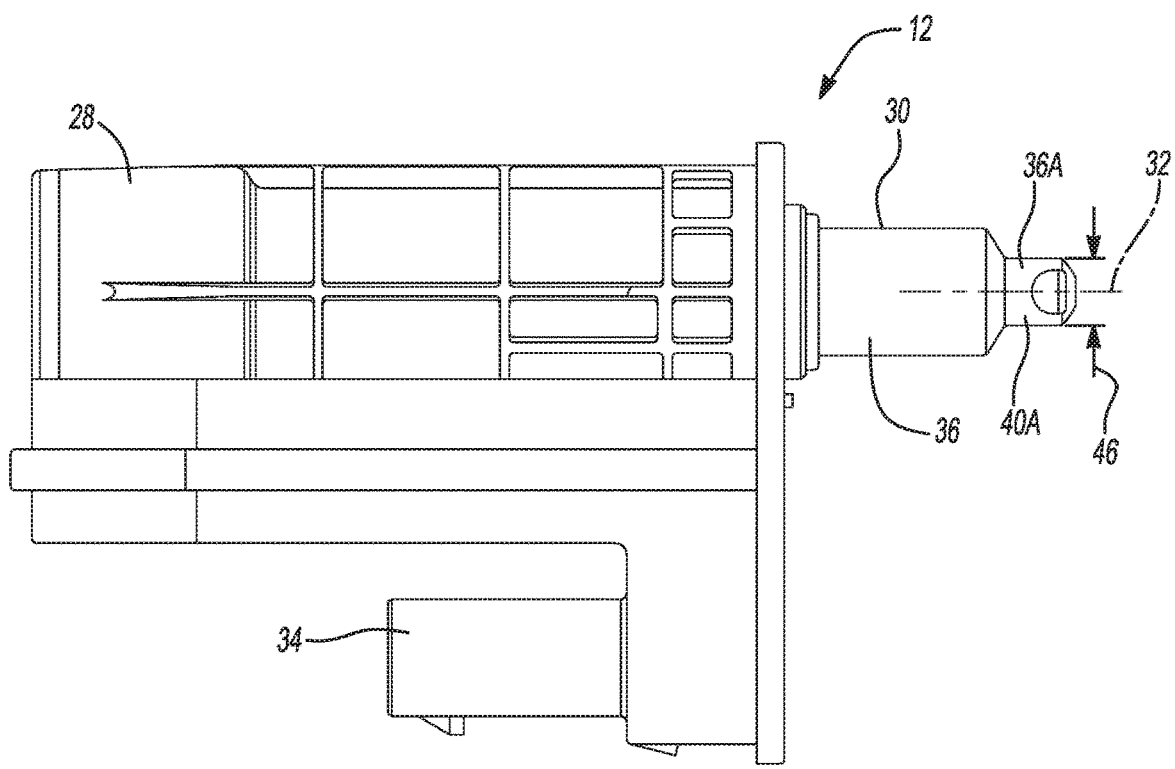
FIG. 3 is a side view of the latching actuator in an unlatched position.
Figure 4:
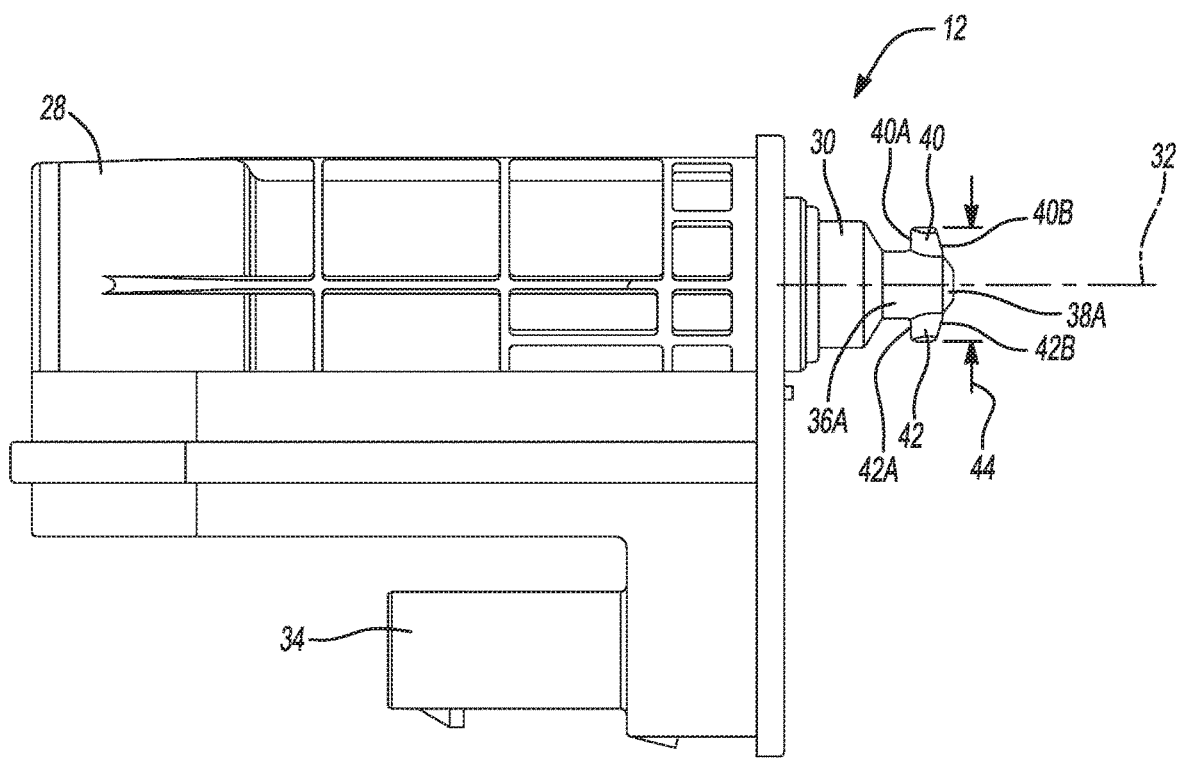
FIG. 4 is a side view of the latching actuator in a latched position.

With reference to FIGS. 2-4, the latching actuator 12 includes a housing 28 and a plunger 30 partially disposed within the housing 28. The plunger 30 is spring assisted and translates along an axis 32 between a retracted, latched position shown in FIG. 3, and an extended, unlatched position shown in FIG. 4. Between the latched position and the unlatched position, the plunger 30 rotates 90 degrees about the axis 32. In the example provided, the latching actuator 12 is configured to lock the plunger 30 into the latched position and thus includes an electrical connector input 34. However, it should be appreciated that the latching actuator 12 may be configured only to latch, and not lock, without departing from the scope of the present disclosure.

The plunger 30 includes a cylindrical body 36 with a distal end 38 extending out and away from the housing 28. Proximate the distal end 38, a first arm 40 extends out from a neck 36A of the body 36 perpendicular to the axis 32. On a side of the body 36 opposite the first arm 40, a second arm 42 extends out from the neck 36A of the body 36 perpendicular to the axis 32. The first arm 40 and the second arm 42 define a plunger end length 44 while the neck 36A defines a plunger end width 46. The plunger end length 44 is greater than the plunger end width 46.

The first arm 40, the second arm 42, and the distal end 38 each have a design configured to minimize wear and friction during engagement with the hinge 14 by utilizing single points of contact, thus providing advantages over the prior art. The first arm 40 includes a first semi-spherical surface 40A and a first front angled surface 40B. The first semi-spherical surface 40A transitions between the neck 36A and the first front angled surface 40B. The first front angled surface 40B transitions into the distal end 38. The first front angled surface 40B is angled, i.e. not perpendicular or parallel, with respect to the axis 32. In one aspect of the present disclosure, the first front angled surface 40B is curved, i.e., not planar, and thus includes an apex. Likewise, the second arm 42 includes a second semi-spherical surface 42A and a second front angled surface 42B. The second semi-spherical surface 42A transitions between the neck 36A and the second front angled surface 42B. The second front angled surface 42B transitions into the distal end 38. The second front angled surface 42B is angled, i.e. not perpendicular or parallel, with respect to the axis 32. In one aspect of the present disclosure, the second front angled surface 42B is curved, i.e., not planar, and thus includes an apex. The distal end 38 is preferably semi-spherical and includes an end point or end apex 38A coaxial with the axis 32.

Returning to FIG. 1, the hinge 14 includes a gooseneck portion 50 connected to a paddle 52. An end of the gooseneck portion 50 is pivotally connected to the port housing 18 at the pivot point 26. The paddle 52 includes an inner surface or back surface 54 and an outer surface or front surface 56. The inner surface 54 faces towards the port housing 18 and thus the latching actuator 12 when the hinge 14 is pivoted into the closed position. The outer surface 56 is disposed opposite the inner surface 54. The door 20 is connected to, and covers, the outer surface 56 of the hinge 14.

The hinge 14 includes a latching interface or locking receptacle 58 disposed in the paddle 52. When the hinge 14 is in the closed position, the locking receptacle 58 is aligned with the latching actuator 12. The locking receptacle 58 is configured to interface with the plunger 30 of the latching actuator 12, which will be described in greater detail below. The locking receptacle 58 includes a slot 60 and a bar 62. The slot 60 is defined by the paddle 52 of the hinge 14 and extends through the paddle 52 from the inner surface 54 to the outer surface 56. The slot 60 defines a slot length 64 and a slot width 66. The slot length 64 is greater than the slot width 66. The slot length 64 is perpendicular to the slot width 66.

Figure 5:
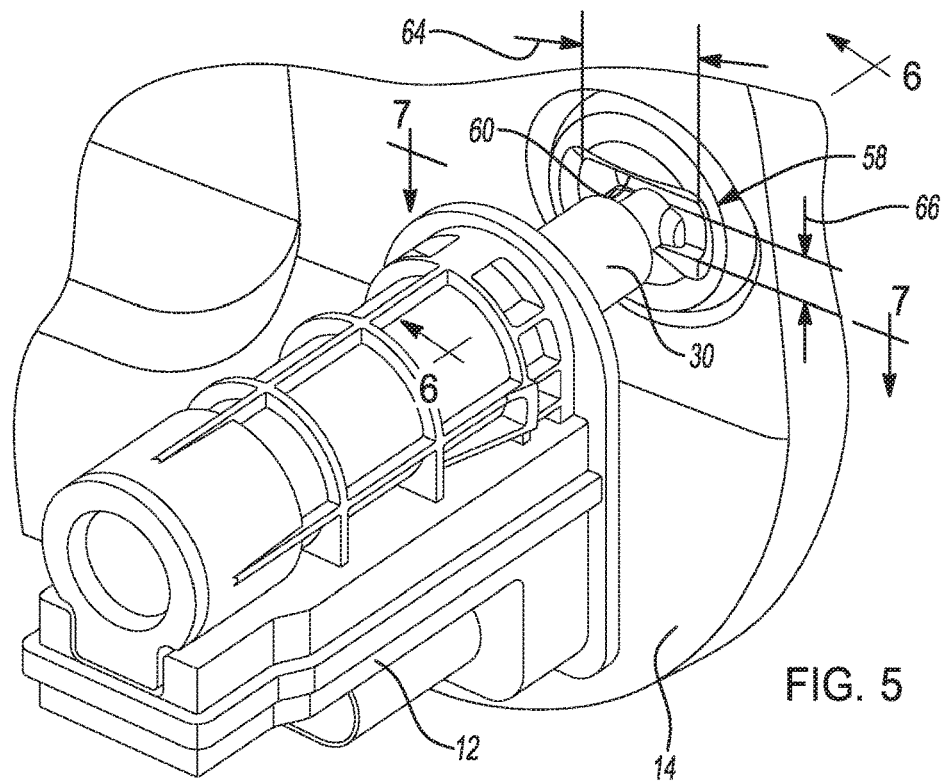
FIG. 5 is a rear perspective view of the latching actuator in an unlatched position engaging a hinge.
Figure 6:
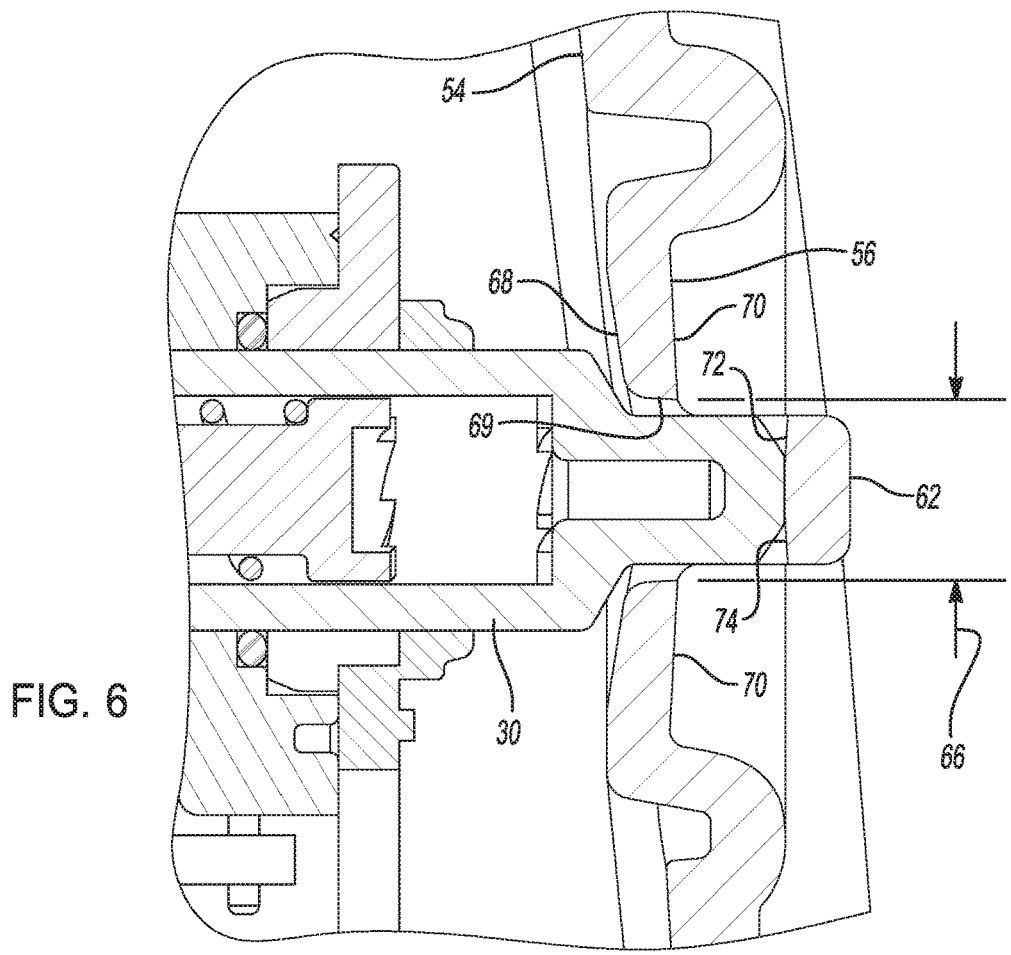
FIG. 6 is a side cross-section view of the latching actuator and the hinge viewed in the direction of arrows 6-6 in FIG. 5.
Figure 7:
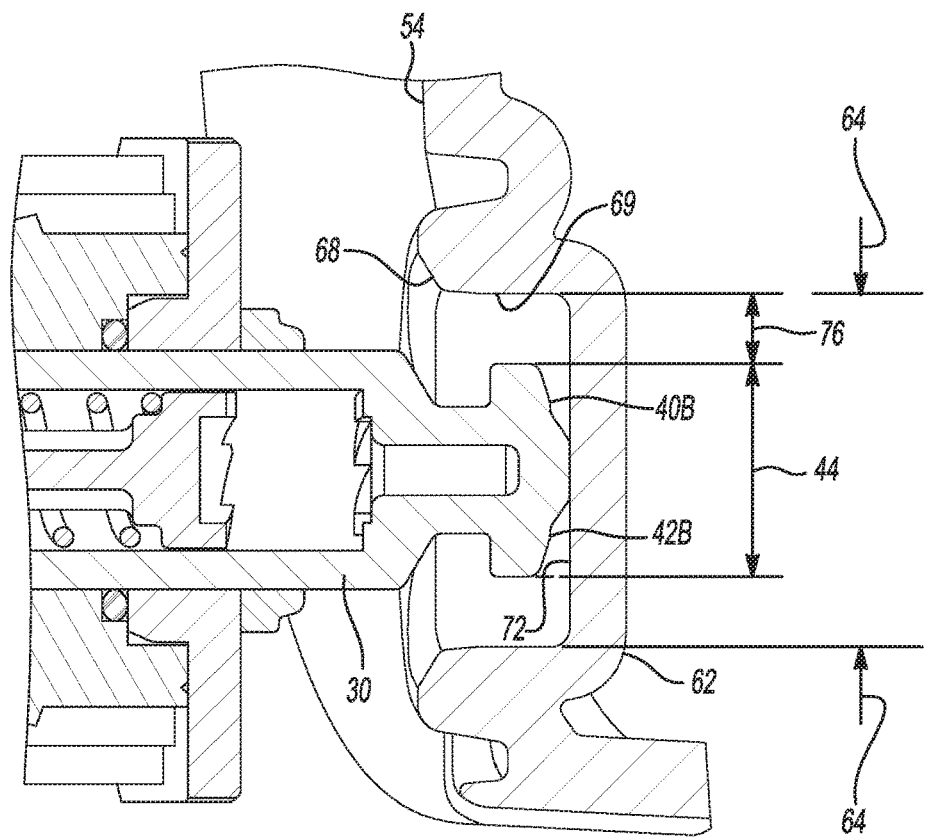
FIG. 7 is a side cross-section view of the latching actuator and the hinge viewed in the direction of arrows 7-7 in FIG. 5.

Turning to FIGS. 5-7, the inner surface 54 of the hinge 14 includes an angled face 68 that surrounds the slot 60. The angled face 68 is angled, i.e. not perpendicular or parallel, with respect to the axis 32. The angled face 68 transitions into walls 69 of the slot 60. The outer surface 56 of the hinge 14 includes a crown 70 that surrounds the slot 60. The crown 70 is a raised surface relative to the surrounding surface to create a line of contact, or apex line, on the outer surface 56 proximate the slot 60 with the plunger 30 of the latching actuator 12.

The bar 62 is connected to the outer surface 56 of the hinge 14 and extends overtop the slot 60 lengthwise. The bar 62 is disposed a distance away from the slot 60 along the axis 32, thereby creating a gap between the slot 60 and the bar 62. The bar 62 includes an inner surface 72 that faces the slot 60. The inner surface 72 is curved, i.e. not planar, with a linear apex 74 that aligns with the axis 32 or the distal end 38 of the plunger 30.

In FIGS. 5-7, the latching actuator 12 is shown in engagement with the hinge 14 in the unlatched position. In this configuration, the door 20 has been swung closed and the plunger 30, extended out from the housing 28, is rotationally oriented such that the first and second arms 40, 42 are aligned with the slot length 64 of the slot 60. As the plunger 30 enters the slot 60, the first and second front angled surfaces 40B, 42B may contact the angled face 68 surrounding the slot 60 if there is any misalignment. These angled surfaces 40B, 42B, and 68 minimize friction and allow the plunger 30 to slide into the slot 60 even if there is misalignment, thus preventing total failure of the latching assembly 10.

In addition, to allow for lateral deviation and variation due to excess force during use that may distort parts, manufacturing variations, etc., the plunger end width 46 is less than the slot width 66 and the plunger end length 44 is less than the slot length 64 by a clearance amount 76. The clearance amount 76 provides for clearance between the arms 40, 42 of the plunger 30 and the walls 69 of the slot 60 when the hinge 14. In a preferred example, the clearance amount 76 is 2 mm. As the door 20 and hinge 14 rotate closed, the distal end 38 of the plunger 30 enters the locking receptacle 58.

As the door 20 and hinge 14 are further pushed closed, the distal end 38 contacts the inner surface 72 of the bar 62. The semi-spherical shape of the distal end 38 and the curved shape of the inner surface 72 provide for point contact between the plunger 30 and the hinge 14, thus minimizing friction and wear.

Figure 8:
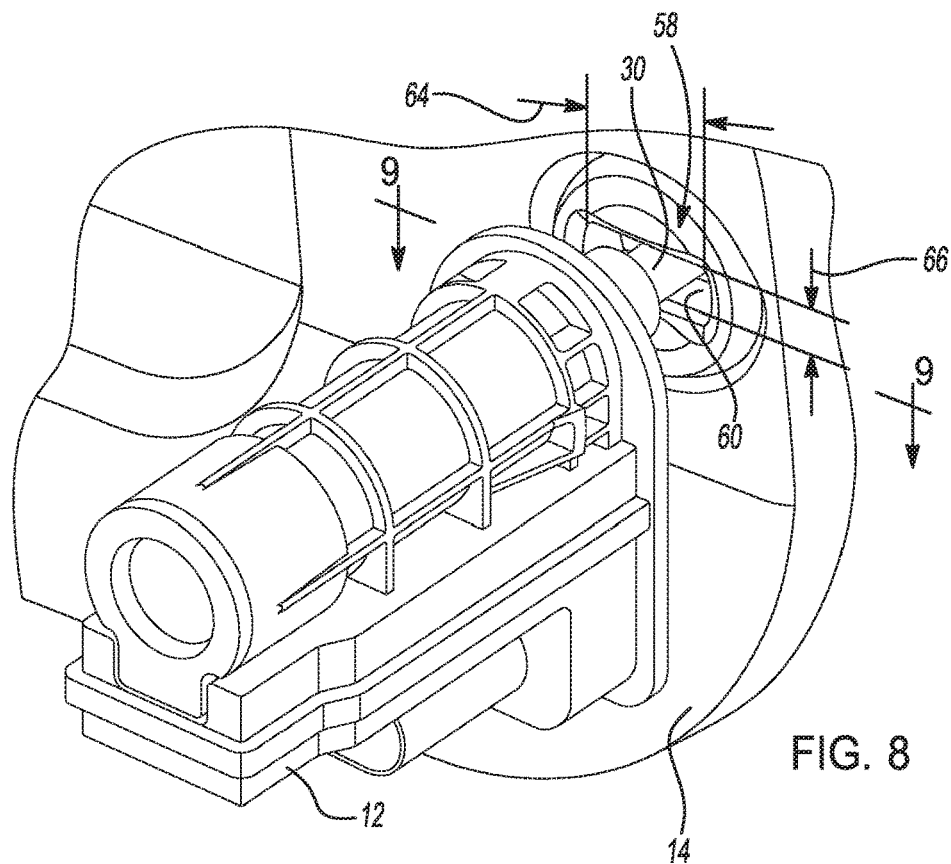
FIG. 8 is a rear perspective view of the latching actuator in a latched position engaging the hinge.
Figure 9:
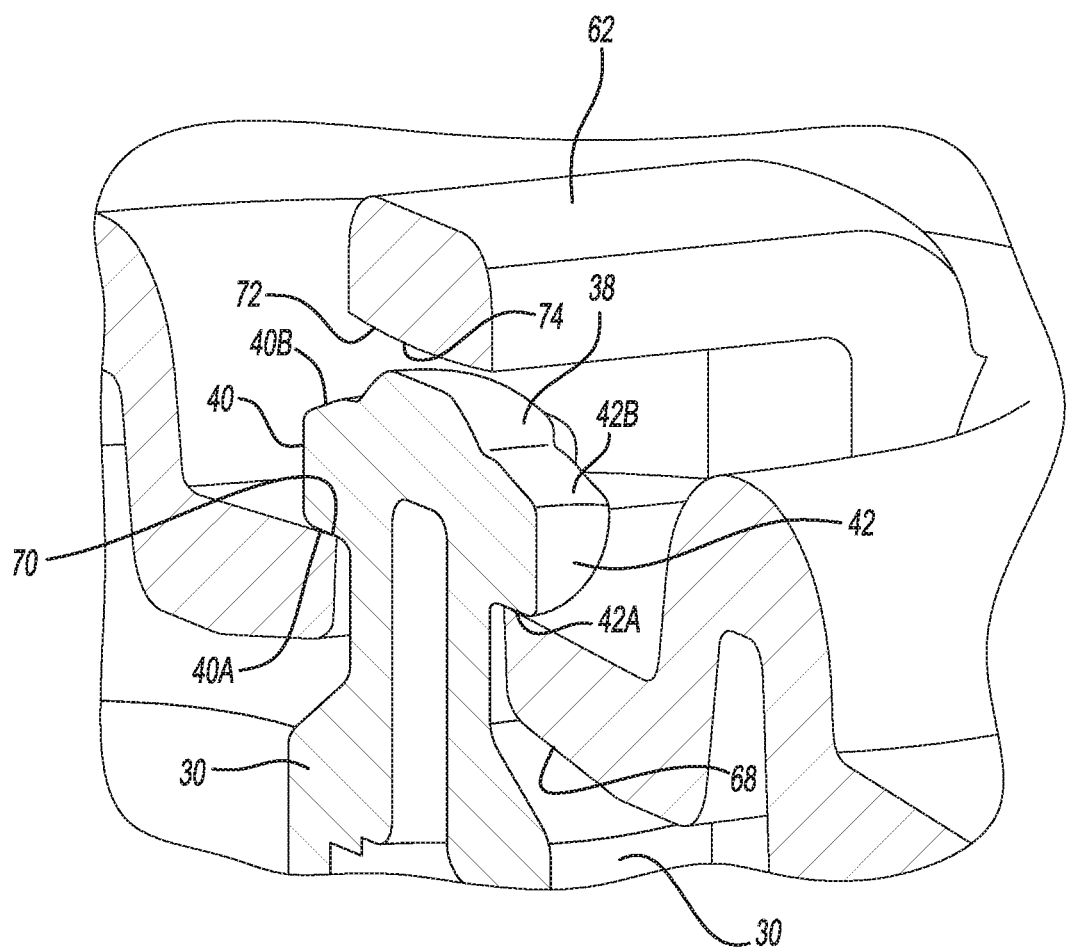
FIG. 9 is a perspective cross-section view of the latching actuator and the hinge viewed in the direction of arrows 9-9 in FIG. 8.

Turing to FIGS. 8-9, as the door 20 and hinge 14 are continued to be closed, the plunger 30 is depressed and translates and rotates. When fully depressed, the plunger 30 is latched in the latched position and the arms 40, 42 have rotated 90 degrees with respect to the hinge 14. Thus, the arms 40, 42 are perpendicular to the slot length 64. The plunger end length 44 is greater than the slot width 66 and thus the hinge 14 is prevented from rotating open and remains latched. In this configuration, the crown 70 that surrounds the slot 60 contacts the semi-spherical surfaces 40A, 42A of the arms 40, 42 to provide a point contact between the plunger 30 and the hinge 14, thus minimizing friction and wear. To unlatch the latching assembly 10, a user pushes further on the door 20 or an electrical signal is sent to unlatch the plunger 30.

The features of the plunger 30 and locking receptacle 58 are advantageous to user operation by preventing impairment of function due to part pending or manufacturing variations. In addition, by minimizing wear and friction between the moving parts, the longevity of the parts is increased.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A latching assembly, comprising:
a hinge defining a slot, the slot having a slot length and a slot width, wherein the slot length is greater than the slot width; and
a latching actuator having a housing and a plunger partially disposed in the housing, the plunger configured to translate and rotate relative to the housing, the plunger having a distal end with a plunger end length and a plunger end width, wherein the plunger end length is greater than the plunger end width, the plunger configured to be inserted into the slot, and
wherein the plunger end length is greater than the slot width and the plunger end length is less than the slot length by a clearance amount,
wherein the plunger end length is defined by a first arm and a second arm each disposed at the distal end that extend out from a body of the plunger, and
wherein the first arm includes a first semi-spherical surface and a first front angled surface and the second arm includes a second semi-spherical surface and a second front angled surface.

2. The latching assembly of claim 1 wherein the hinge includes a bar that extends over the slot on a side of the hinge away from the latching actuator, wherein the distal end of the plunger contacts the bar when disposed through the slot.

3. The latching assembly of claim 2 wherein the bar has a curved surface that faces the slot.

4. The latching assembly of claim 3 wherein the distal end of the plunger is semi-spherical.

5. The latching assembly of claim 4 wherein an apex of the semi-spherical distal end is coaxial with the body of the plunger.

6. The latching assembly of claim 1 wherein the plunger is moveable between a latched position and an unlatched position, and the first and second arms are aligned with the slot length when in the unlatched position and the first and second arms are perpendicular to the slot length when in the latched position.

7. The latching assembly of claim 1 wherein the hinge includes an angled face surrounding the slot.

8. The latching assembly of claim 7 wherein the hinge includes an inner surface that faces the latching actuator, and the angled face is disposed on the inner surface.

9. The latching assembly of claim 8 wherein the hinge includes an outer surface that faces away from the latching actuator, and the outer surface having a crown that surrounds the slot.

10. The latching assembly of claim 1 further comprising a door coupled to the hinge.

11. An assembly for a fuel/charge port comprising:
a door;
a hinge defining a slot, the slot having a slot length and a slot width, wherein the slot length is greater than the slot width, the hinge including a bar disposed overtop the slot to define a locking receptacle; and
a latching actuator having a housing and a plunger partially disposed in the housing, the plunger configured to translate and rotate relative to the housing, the plunger having a first arm and a second arm each disposed at a distal end, the first and second arms defining a plunger end length, wherein the plunger is moveable between a latched position where the first and second arms are disposed in the locking receptacle and are perpendicular to the slot length and an unlatched position where the first and second arms are aligned with the slot length,
wherein the plunger end length is greater than the slot width and the plunger end length is less than the slot length by a clearance amount,
wherein the hinge includes a front surface and a back surface, and the back surface includes an angled face surrounding the slot,
wherein the front surface includes a crown surrounding the slot,
wherein the door is attached to the front surface of the hinge, and
wherein the first arm includes a first semi-spherical surface configured to engage the crown of the hinge and a first front angled surface configured to engage the angled face of the hinge, and the second arm includes a second semi-spherical surface configured to engage the crown of the hinge and a second front angled surface configured to engage the angled face of the hinge.

12. The assembly of claim 11 wherein the bar has a curved surface that faces the slot and the distal end of the plunger contacts the curved surface of the bar when disposed through the slot and moving to the latched position.

13. The assembly of claim 11 wherein the clearance amount is approximately 2 mm.

14. An assembly for a fuel/charge port comprising:
a hinge having a front surface, a back surface and defining a slot, the slot having a slot length and a slot width, wherein the slot length is greater than the slot width, the hinge including a bar disposed on the front surface over the slot to define a locking receptacle, wherein the back surface includes an angled face surrounding the slot and the front surface includes a crown surrounding the slot;
a door coupled to the front surface of the hinge; and
a latching actuator having a housing and a plunger partially disposed in the housing, the plunger configured to translate and rotate relative to the housing, the plunger having first and second arms disposed at a distal end, the first and second arms defining a plunger end length, wherein the plunger is moveable between a latched position where the first and second arms are disposed in the locking receptacle and are perpendicular to the slot length and an unlatched position where the first and second arms are aligned with the slot length, wherein the first arm includes a first semi-spherical surface and a first front angled, and the second arm includes a second semi-spherical surface and a second front angled surface, wherein the first and second semi-spherical surfaces are configured to engage the crown of the hinge when in the latched position and the first and second angled front surfaces are configured to engage the angled face of the hinge when the plunger is inserted into the locking receptacle,
wherein the bar has a curved surface that faces the slot and the distal end of the plunger contacts the curved surface of the bar when disposed through the slot and moving to the latched position, and
wherein the plunger end length is greater than the slot width and the plunger end length is less than the slot length by a clearance amount.

* * * * *